(12) United States Patent
Madineni et al.

(10) Patent No.: US 12,103,433 B2
(45) Date of Patent: *Oct. 1, 2024

(54) SYSTEMS AND METHODS FOR CONTROLLING TOWING OF A VEHICLE

(71) Applicant: Rivian IP Holdings, LLC, Plymouth, MI (US)

(72) Inventors: Rahul Madineni, Farmington Hills, MI (US); Ashwini P. Amin, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/641,649

(22) PCT Filed: Sep. 17, 2021

(86) PCT No.: PCT/US2021/050867
§ 371 (c)(1),
(2) Date: Mar. 9, 2022

(87) PCT Pub. No.: WO2022/061109
PCT Pub. Date: Mar. 24, 2022

(65) Prior Publication Data
US 2024/0043004 A1    Feb. 8, 2024

Related U.S. Application Data

(60) Provisional application No. 63/079,846, filed on Sep. 17, 2020.

(51) Int. Cl.
*B60W 30/18*    (2012.01)
*B60L 7/26*    (2006.01)
(Continued)

(52) U.S. Cl.
CPC ............... *B60L 7/26* (2013.01); *B60Q 1/30* (2013.01); *B60Q 1/346* (2013.01); *B60Q 1/44* (2013.01);
(Continued)

(58) Field of Classification Search
CPC .......... B60W 30/18009; B60W 10/08; B60W 10/184; B60W 2554/4045;
(Continued)

(56) References Cited

U.S. PATENT DOCUMENTS

| | | |
|---|---|---|
| 5,241,241 A | 8/1993 | Eccleston |
| 6,222,443 B1 | 4/2001 | Beeson et al. |

(Continued)

FOREIGN PATENT DOCUMENTS

| | | | | |
|---|---|---|---|---|
| AU | 2016344763 A1 | * | 6/2017 | ............ B60T 8/1708 |
| AU | 2017326531 A1 | * | 5/2019 | .............. B60T 13/66 |
| GB | 2447105 A | * | 9/2008 | .......... B60L 11/1861 |

OTHER PUBLICATIONS

Kouki et al., "Nonholonomic Equivalent Disturbance Based Backward Motion Control of Tractor-Trailer With Virtual Steering," 2008, vol. 55, Publisher: IEEE.*

(Continued)

*Primary Examiner* — Tuan C To
(74) *Attorney, Agent, or Firm* — Foley & Lardner LLP

(57) ABSTRACT

Various disclosed embodiments include systems, vehicles, and methods for controlling towing of a vehicle without an electrical connection between a tow vehicle and a towed vehicle. In an illustrative embodiment, a system includes a controller. The controller includes a processor and computer-readable media configured to store computer-executable instructions configured to cause the processor to: receive sensed data indicative of at least one attribute of a tow vehicle without an electrical connection between the (Continued)

tow vehicle and a towed vehicle; and control an attribute of the towed vehicle responsive to the sensed data indicative of a corresponding attribute of the tow vehicle.

20 Claims, 14 Drawing Sheets

(51) Int. Cl.
  *B60Q 1/30* (2006.01)
  *B60Q 1/34* (2006.01)
  *B60Q 1/44* (2006.01)
  *B60T 7/20* (2006.01)
  *B60T 17/22* (2006.01)
  *B60W 10/08* (2006.01)
  *B60W 10/184* (2012.01)

(52) U.S. Cl.
  CPC ............... *B60T 7/20* (2013.01); *B60T 17/22* (2013.01); *B60W 10/08* (2013.01); *B60W 10/184* (2013.01); *B60W 30/18009* (2013.01); *B60L 2240/461* (2013.01); *B60W 2420/403* (2013.01); *B60W 2420/408* (2024.01); *B60W 2420/54* (2013.01); *B60W 2554/4045* (2020.02)

(58) Field of Classification Search
  CPC ..... B60W 2420/408; B60W 2420/403; B60W 2420/54; B60Q 1/30; B60Q 1/346; B60Q 1/44
  USPC .......................................................... 701/22
  See application file for complete search history.

(56) References Cited

U.S. PATENT DOCUMENTS

| | | | | |
|---|---|---|---|---|
| 6,516,925 B1* | 2/2003 | Napier | .................. | B60T 8/1708 188/112 A |
| 2002/0163249 A1 | 11/2002 | Palmer et al. | | |
| 2008/0012695 A1* | 1/2008 | Herschell | .................. | B60T 7/18 340/431 |
| 2010/0282122 A1 | 11/2010 | Mai | | |
| 2011/0186366 A1 | 8/2011 | Heller et al. | | |
| 2012/0283925 A1 | 11/2012 | Barlsen et al. | | |
| 2013/0311058 A1 | 11/2013 | Wojtkowicz et al. | | |
| 2015/0210254 A1* | 7/2015 | Pieronek | ................. | B60T 8/248 701/70 |
| 2015/0246674 A1 | 9/2015 | Weston et al. | | |
| 2016/0023525 A1* | 1/2016 | Lavoie | ................... | B60D 1/305 701/70 |
| 2016/0347296 A1 | 12/2016 | Mueller et al. | | |
| 2017/0217372 A1* | 8/2017 | Lu | ........................... | H04N 7/181 |
| 2017/0282870 A1* | 10/2017 | Meade | ................. | B60T 8/1708 |
| 2018/0099660 A1* | 4/2018 | Weigert | ................ | B60W 30/06 |
| 2018/0236994 A1* | 8/2018 | Healy | ...................... | B60K 6/40 |
| 2019/0084534 A1 | 3/2019 | Kasper et al. | | |
| 2019/0086204 A1 | 3/2019 | Critchley et al. | | |
| 2019/0126759 A1 | 5/2019 | Miller et al. | | |
| 2019/0217847 A1 | 7/2019 | Hawley | | |
| 2019/0308473 A1* | 10/2019 | Yu | ..................... | B60W 50/0098 |
| 2020/0070795 A1 | 3/2020 | Van Thiel | | |
| 2020/0122709 A1 | 4/2020 | Cunningham et al. | | |
| 2020/0172060 A1* | 6/2020 | Decker, Jr. | ............... | B60T 17/22 |
| 2020/0233410 A1* | 7/2020 | Burns | ..................... | B60L 50/66 |
| 2020/0247371 A1* | 8/2020 | VanAntwerp | ......... | B60T 8/1708 |
| 2020/0247372 A1* | 8/2020 | VanAntwerp | ........... | B60T 8/174 |
| 2021/0323519 A1* | 10/2021 | Robertson | ............... | B60T 8/172 |
| 2021/0394723 A1* | 12/2021 | Decker, Jr. | ................ | B60T 7/20 |
| 2023/0028030 A1* | 1/2023 | Madineni | .................. | B60L 1/00 |

OTHER PUBLICATIONS

Rivian, "EV Tow Charging IP Landscape," Aug. 3, 2021, pp. 1-5, Plymouth, USA.

Jan. 5, 2022 International Search Report and Written Opinion issued in International Application No. PCT/US2021/050867.

Non-Final Office Action on U.S. Appl. No. 17/765,780 dated Jun. 20, 2024.

* cited by examiner

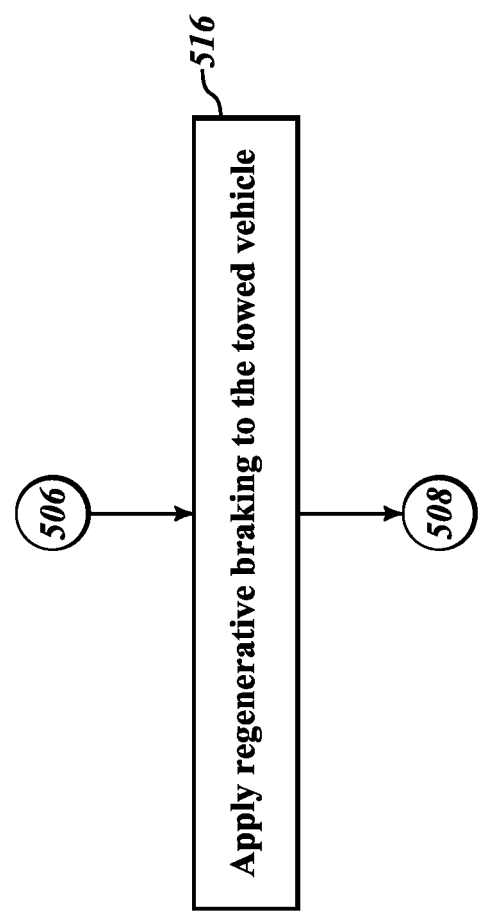

SYSTEMS AND METHODS FOR CONTROLLING TOWING OF A VEHICLE

CROSS-REFERENCE TO RELATED APPLICATION

The present disclosure claims the benefit of priority of co-pending International Application No. PCT/US21/50867, filed on Sep. 17, 2021, and entitled "SYSTEMS AND METHODS FOR CONTROLLING TOWING OF A VEHICLE," which claims priority to U.S. Provisional Patent Application No. 63/079,846, filed on Sep. 17, 2020, and entitled "SYSTEMS AND METHODS FOR TOWING AN ELECTRIC VEHICLE WITHOUT EXTERNAL ELECTRICAL CONNECTION TO A TOW VEHICLE, SELECTIVE REGENERATIVE BRAKING DURING DECELERATION IN A TOWED ELECTRIC VEHICLE, AND POWERING LOW VOLTAGE ELECTRICAL LOADS IN A TOWED ELECTRIC VEHICLE," the contents of which are incorporated in full by reference herein.

INTRODUCTION

The present disclosure relates to towing an electric vehicle.

When a motor vehicle is being towed behind a tow vehicle, signal lights (that is, brake lights, turn signals, and backing lights) and braking of the towed vehicle currently are synchronized with the tow vehicle via an external electrical connection between the tow vehicle and the towed vehicle and with aftermarket equipment, such as auxiliary braking systems.

When an electric vehicle driven by permanent magnet synchronous motors is towed, back electromotive force (back emf) is generated that, beyond a certain motor speed, may be higher than voltage of a high voltage high voltage (HV) direct current (DC) bus and, if uncontrolled, could cause energy to flow back into the battery in an uncontrolled manner. Further, uncontrolled back emf that is not consumed into the battery may subject inverter components or other components on the HV DC bus to voltages that may be greater than their designed voltage ranges.

Moreover, constant, uncontrolled application of regenerative braking torque in a towed electric vehicle can cause additional fuel to be consumed by the tow vehicle and can possibly add to instability of the towed electric vehicle by adding sway.

The statements in this section merely provide background information related to the present disclosure and may not constitute prior art.

BRIEF SUMMARY

Various disclosed embodiments include systems, vehicles, and methods for controlling towing of a vehicle without an electrical connection between a tow vehicle and a towed vehicle.

In an illustrative embodiment, a system includes a controller. The controller includes a processor and computer-readable media configured to store computer-executable instructions configured to cause the processor to: receive sensed data indicative of at least one attribute of a tow vehicle without an electrical connection between the tow vehicle and a towed vehicle; and control an attribute of the towed vehicle responsive to the sensed data indicative of a corresponding attribute of the tow vehicle.

In another illustrative embodiment, a vehicle includes rotatable wheels and at least one drive unit. The at least one drive unit includes at least one inverter, at least one electric motor electrically couplable to the at least one inverter and rotatably couplable to at least one of the rotatable wheels, and at least one inverter controller configured to control the at least one inverter. The vehicle also includes at least one sensor and a controller. The controller includes a processor and computer-readable media configured to store computer-executable instructions configured to cause the processor to: receive sensed data indicative of at least one attribute of a tow vehicle without an electrical connection between the tow vehicle and the towed vehicle; and control an attribute of a towed vehicle responsive to the sensed data indicative of a corresponding attribute of the tow vehicle.

In another illustrative embodiment, a method includes: sensing data indicative of at least one attribute of a tow vehicle without an electrical connection between the tow vehicle and the towed vehicle; and controlling an attribute of a towed vehicle responsive to the sensed data indicative of a corresponding attribute of the tow vehicle.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

FIGS. 5B-5F are flow charts of details of the method of FIG. 5A.

Like reference symbols in the various drawings generally indicate like elements.

DETAILED DESCRIPTION

Figure 1:
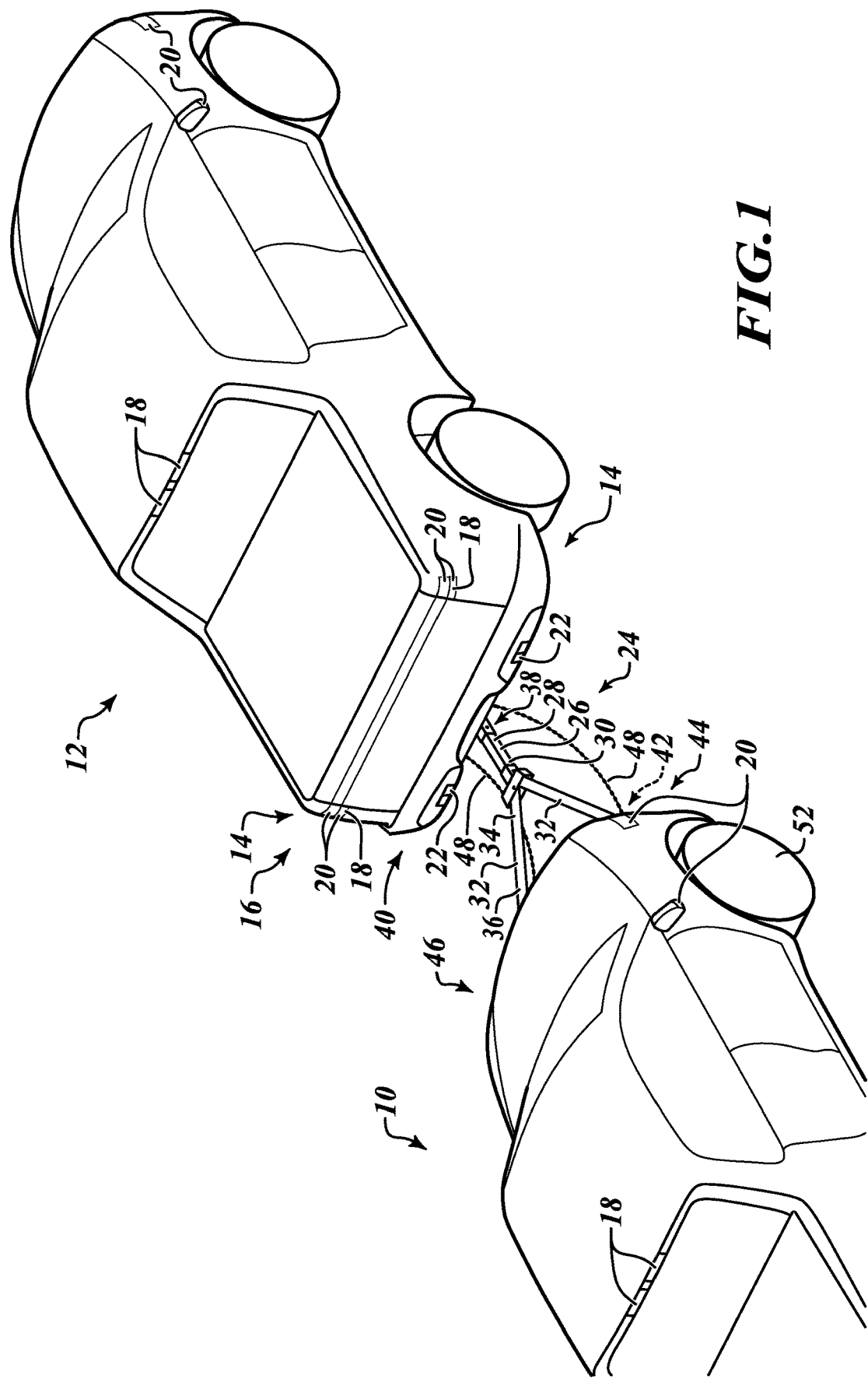
FIG. 1 is a perspective view of an illustrative electric vehicle being towed by a tow vehicle.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Various disclosed embodiments include systems, vehicles, and methods for controlling towing of a vehicle without an electrical connection between a tow vehicle and a towed vehicle.

By way of nonlimiting overview and referring to FIGS. 1 and 2, in various embodiments an illustrative system includes a controller 64. The controller 64 includes a processor 66 and computer-readable media 68 configured to store computer-executable instructions configured to cause the processor 66 to: receive sensed data indicative of at least one attribute of a tow vehicle 12 without an electrical connection between the tow vehicle 12 and a towed vehicle 10; and control an attribute of the towed vehicle 10 responsive to the sensed data indicative of a corresponding attribute of the tow vehicle 12.

Illustrative details regarding the vehicle 10 (to be towed) will be explained first by way of illustration only and not of limitation. Then, illustrative details regarding controlling the towing of the vehicle 10 without an electrical connection between the tow vehicle 12 and the towed vehicle 10 and controlling the inverter 56 of the towed vehicle 10 will be explained by way of illustration only and not of limitation.

The present disclosure refers to "deceleration." As used herein, deceleration is negative acceleration.

As shown in FIG. 1, the vehicle 10 is towable behind 12 tow vehicle 12. In various embodiments the vehicle 10 may be any suitable electric vehicle, such as, for example, an electric vehicle, a hybrid vehicle, a plug-in hybrid vehicle, and the like. However, it will be appreciated that, as explained below, in some embodiments the vehicle 10 may be any type motor vehicle whatsoever regardless of source of propulsion and may also include vehicles powered by an internal combustion engine, such as a spark-ignition engine or a compression-ignition engine, a fuel cell, natural gas, propane, or the like. Regardless of propulsion source, the vehicle 10 may be any type of towable motor vehicle whatsoever as desired, such as, for example and without limitation, a car, a truck, a sport-utility vehicle, a van, a motorhome, a bus, or the like.

In various embodiments, the tow vehicle 12 may be any type of motor vehicle (that is capable of towing another motor vehicle) whatsoever as desired, such as, for example and without limitation, a car, a truck, a sport-utility vehicle, a van, a motorhome, a bus, or the like. The tow vehicle 12 includes various signal lights 14 disposed about an aft end 16 of the tow vehicle 12. The signal lights 14 are configured to illuminate and convey information to others regarding actions of the tow vehicle 12 and intentions of a driver of the tow vehicle 12. For example, the signal lights 14 suitably include brake lights 18, turn signals 20, and a backing light 22.

The vehicle 10 is suitable tethered to the tow vehicle 12 via a tow bar 24. The tow bar 24 includes a shank 26 having a forward end 28 and an aft end 30. The tow bar 24 also includes arms 32 that each have a forward end 34 and an aft end 36. The arms 32 are attached at their forward ends 34 to the aft end 30 of the shank 26.

A hitch receiver 38 is attached to a lower portion 40 of the aft end 16 of the tow vehicle 12. A base plate (not shown for purposes of clarity) having a cross member 42 is attached to a lower portion 44 of a front end 46 of the vehicle 10. The hitch receiver 38 evenly distributes towing loads to a frame (not shown for purposes of clarity) of the tow vehicle 12 and the base plate evenly distributes towing loads to a frame (not shown for purposes of clarity) of the vehicle 10. The forward end 28 of the shank 26 is removably attached to the hitch receiver 38 and the aft ends 36 of the arms 32 are removably attached to the base plate. Safety cables 48 (such as steel cables or chains) suitably are removably attached to the hitch receiver 38 and the base plate to help prevent accidental and/or inadvertent disconnection of the towed vehicle 10 from the tow vehicle 12.

As will be explained below, in various embodiments towing of the vehicle 10 can be controlled without an electrical connection between the tow vehicle 12 and the vehicle 10 and, in various embodiments, the inverter 56 of the vehicle 10 can likewise be controlled without an electrical connection between the tow vehicle 12 the vehicle 10. As such, it will be appreciated that, in various embodiments, the vehicle 10 can be towed behind the tow vehicle 12 at highway speeds without an electrical connection between the tow vehicle 12 the vehicle 10 and without use of aftermarket equipment.

Figure 2A:
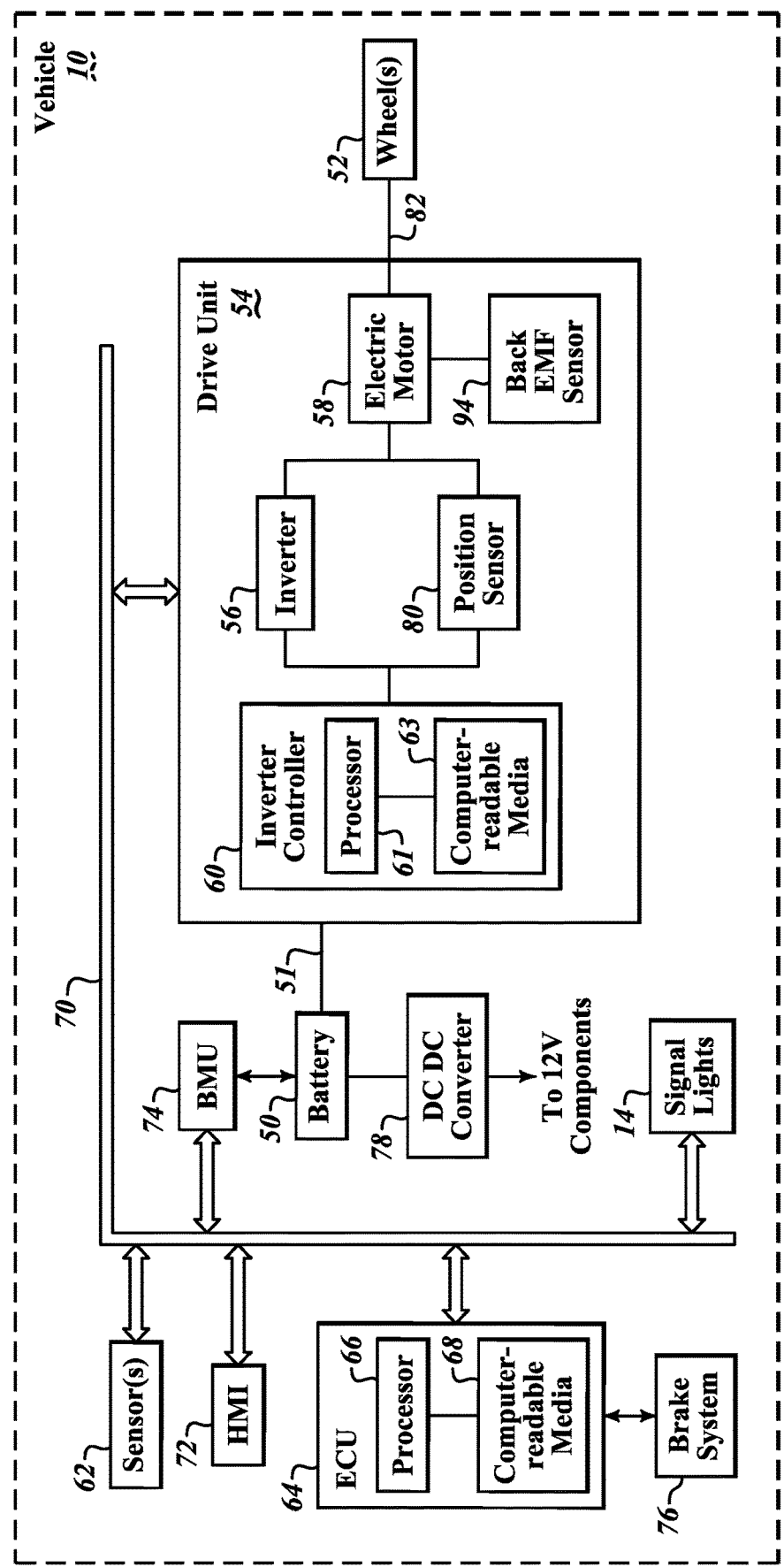
FIG. 2A is a block diagram of the illustrative electric vehicle of FIG. 1.

As shown in FIG. 2A, in various embodiments and as an initial, high-level introductory example the vehicle 10 includes a high-voltage, direct current (DC) electrical battery 50, rotatable wheels 52, and at least one drive unit 54. Each drive unit 54 suitably includes at least one inverter 56 electrically couplable to the battery 50. Each inverter 56 suitably includes three-terminal power semiconductor devices (not shown in FIG. 2A). Each drive unit 54 also suitably includes at least one electric motor 58 electrically couplable to the at least one inverter 56 and rotatably couplable to at least one of the rotatable wheels 52. Each drive unit 54 also includes at least one inverter controller 60 configured to control the at least one inverter 56. The vehicle 10 also includes at least one sensor 62 and a controller 64 (such as an electronics control unit or ECU). The controller 64 includes a processor 66 and computer-readable media 68 configured to store computer-executable instructions.

Now that an initial, high-level introductory example of the vehicle 10 has been set forth, additional details will be explained by way of non-limiting examples provided by way of illustration only and not of limitation.

As also shown in FIG. 2A, in various embodiments the battery 50 includes a high-voltage DC electrical battery. In such embodiments, the battery 50 is configured to provide high-voltage DC electrical power, such as on the order of around 450 volts or so via a high voltage (HV) DC bus 51. In various embodiments the battery 50 may include a lithium-ion battery. However, it will be appreciated that the battery 50 may include any suitable battery as desired and that further description of the battery is not necessary for a person of skill in the art to understand disclosed subject matter.

In various embodiments the vehicle 10 includes the electronics control unit (ECU) 64 that controls operations of various components via a peer-to-peer network bus 70 such as a controller area network (CAN) bus. Other peer-to-peer network buses, such as a local area network (LAN), a wide area network (WAN), or a value-added network (VAN), may also be used for enabling communication between the ECU 64 and the components connected to the peer-to-peer network bus 70.

In various embodiments the processor 66 may include a computer processing unit (CPU), a general purpose processor, a digital signal processor, a field programmable gate array, or the like, and/or any combination thereof. Processors are well known and further description of their construction and operation are not necessary for an understanding by a person of skill in the art of disclosed subject matter.

In various embodiments the computer-readable media 68 may include any suitable computer memory configured to store computer-executable instructions configured to cause the processor 66 to perform functions described herein. Given by way of non-limiting examples, the computer-readable media 68 may include any suitable volatile memory elements, such as without limitation random access memory (RAM), such as dynamic RAM (DRAM), static RAM (SRAM), static-dynamic RAM (SDRAM), and the like, nonvolatile memory elements such as without limitation read-only-memory (ROM), hard drive, tape, compact-disc ROM (CDROM), and the like, and combinations thereof. Moreover, the computer-readable media 18 may incorporate electronic, magnetic, optical, and/or other types of storage media as desired.

In various embodiments the ECU 64 communicates via the peer-to-peer network bus 70 with a human-machine interface (HMI) 72. In various embodiments and given by way of example only and not of limitation, the HMI 72 may include mechanical buttons or switches or may include selectable graphical user interface features presented on a vehicle display device(s).

In various embodiments the ECU 64 communicates via the peer-to-peer network bus 70 with a battery management unit (BUM) 74. In various embodiments and given by way of example only and not of limitation, the BMU 74 communicates with the battery 50 to generate battery status information, which is sent to the ECU 64 via the peer-to-peer network bus 70. The BMU 74 receives battery information from the battery 50 and/or from any sensors (not shown for purposes of clarity) associated with or included in the battery 50. The battery information may include state of charge (SOC), temperature, voltage of battery cells, input/output current, coolant flow, or other values related to battery operations. The BMU 74 uses the battery information to control battery recharging and battery thermal management and to communicate with other components of the vehicle 10 via the peer-to-peer network bus 70 or with external components or other systems or devices as desired.

In various embodiments, the ECU 64 communicates with a brake system 76 directly or via the peer-to-peer network bus 70. In various embodiments the brake system 76 may include a foot pedal (not shown for purposes of clarity), a brake solenoid or pressure sensor (not shown for purposes of clarity), a handbrake (not shown for purposes of clarity), a steering wheel-mounted brake paddle (not shown for purposes of clarity), or comparable brake components (not shown for purposes of clarity), and friction brakes (not shown for purposes of clarity). In various embodiments, if desired, the brake system 76 may be a brake-by-wire system or any type of brake system as desired.

In various embodiments, a DC/DC converter 78 is electrically coupled to the battery 50 to provide DC electrical power at an appropriate DC voltage level (such as, for example and without limitation, around 12 VDC or so) to various auxiliary loads that are to be energized while the vehicle 10 is being towed, such as various control units, external lighting systems, coolant pumps for cooling the drive units 54 and their components, and the like.

In various embodiments the drive unit 54 may include one or more inverters 56, one or more position sensors 80 such as a resolver, and one or more electric motors 58, such as without limitation brushless direct current (BLDC) motors, alternating current induction motors (ACIM), permanent magnet (PM) synchronous motors (PMSM), interior PM motors (IPMM), PM switch reluctance motors (PMSRM), or any suitable electric motors whatsoever as desired. A back emf sensor 94 is configured to sense and measure back emf of an associated electric motor 58 when the electric motor 58 is functioning as a generator.

The drive unit 54 also includes at least one inverter controller 60 electrically coupled to the inverter(s) 56 and the position sensor(s) 80. The inverter controller 60 includes a processor 61 and computer-readable media 63 configured to store computer-executable instructions configured to cause the processor 61 to perform functions described herein. In various embodiments, the ECU 64 communicates with the inverter controller 60 via the peer-to-peer network bus 70 to cause the inverter controller 60 to perform various functions described herein. A drive member 82, such as an axle or the like, is rotatably coupled to the electric motor 58. At least one propulsion wheel 52 is rotatably couplable to the drive member 82.

It will be appreciated that, if desired, one or more of the wheels 52 suitably may be rotatably disconnectable as desired from an associated electric motor 58, thereby preventing the associated motor 58 from rotating while the vehicle 10 is being towed. However, in various embodiments at least one electric motor 58 is rotatable by its associated wheel 52 while the vehicle 10 is towed, thereby providing for application of regenerative braking and charging of the battery 50 as desired and as further explained below.

Figures 2B, 2C:
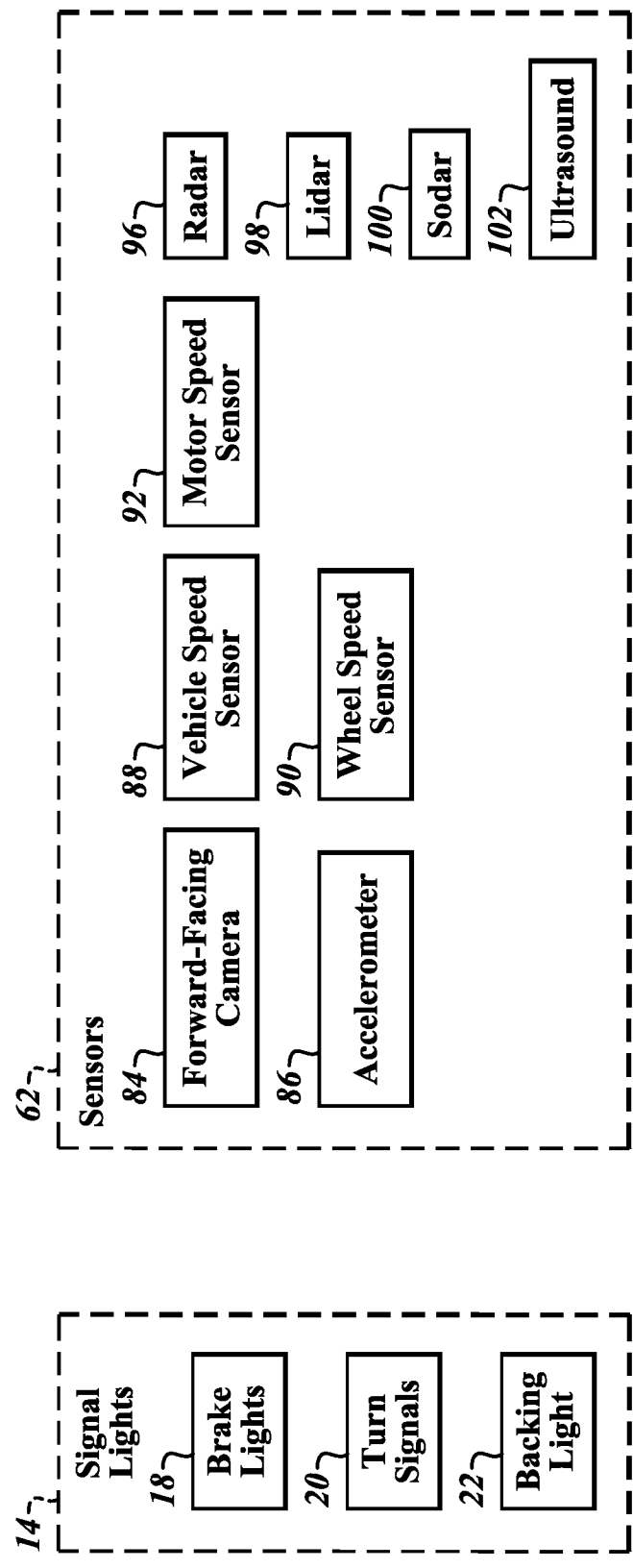
FIG. 2B is a block diagram of illustrative signal lights of the vehicle of FIGS. 1 and 2.
FIG. 2C is a block diagram of illustrative sensors of the vehicle of FIGS. 1 and 2A.

Referring additionally to FIG. 2B, in various embodiments the signal lights 14 of the vehicle 10 may also include, without limitation, at least one of the brake lights 18, at least one of the turn signals 20 (FIG. 1), and the backing light 22. In various embodiments, the ECU 64 communicates with the signal lights 14 via the peer-to-peer network bus 70 to perform various functions described herein.

Referring additionally to FIG. 2C, in various embodiments the sensors 62 may include any sensor desired for a particular application. For example and by way of non-limiting example, in various examples the sensors 62 may include, without limitation, a forward-facing camera 84, an accelerometer 86 (that senses fore/aft acceleration and/or lateral acceleration), a vehicle speed sensor 88, a wheel speed sensor 90, and a motor speed sensor 92. Also, in various embodiments the sensors 62 may include, without limitation, a radio detection and ranging (RADAR) sensor 96, a light detection and ranging (LIDAR) sensor 98, a sound detection and ranging (SODAR) sensor 100, an ultrasound sensor 102, and the like. In various embodiments, the ECU 64 communicates with the sensors 62 via the peer-to-peer network bus 70 to perform various functions described herein.

Now that the vehicle 10 has been described, controlling towing of the vehicle 10 without an electrical connection between the tow vehicle 12 and the vehicle 10 will be explained by way of non-limiting examples given by way of illustration only and not of limitation.

In various embodiments the computer-executable instructions are configured to cause the processor 66 to receive from the at least one sensor 62 sensed data indicative of at least one attribute of the tow vehicle 12 without an electrical connection between the tow vehicle 12 and the vehicle 10 and to cause the processor 66 to control an attribute of the vehicle 10 responsive to the sensed data indicative of a corresponding attribute of the tow vehicle 12.

In some such embodiments, the signal lights 14 of the tow vehicle 12 and the signal lights 14 of the vehicle 10 can be synchronized. It will be appreciated that in such embodiments the vehicle 10 may be any type motor vehicle whatsoever regardless of source of propulsion and may also include vehicles powered by an internal combustion engine, such as a spark-ignition engine or a compression-ignition engine, a fuel cell, natural gas, propane, or the like (in addition to the electric vehicles described above).

In such embodiments, the tow vehicle attribute includes visual signaling, the sensor 62 includes a forward-facing camera 84, and the data indicative of the tow vehicle attribute includes at least one datum such as visually detected illumination of at least one brake light 18 of the tow vehicle 12, visually detected illumination of a turn signal 20 of the tow vehicle 12, and visually detected illumination of a backing light of the tow vehicle 12. It will be appreciated that, in various embodiments, data from the camera 84 may include image data and/or video data.

In such embodiments, the instructions are further configured to cause the processor 66 to cause illumination of a signal light of the vehicle 10, such as at least one brake light 18, a turn signal 20, and a backing light 22 responsive to data indicative of a corresponding attribute (that is, illumination of a corresponding signal light 14) of the two vehicle 12.

In some other embodiments, braking of the tow vehicle 12 and braking of the vehicle 10 can be synchronized. It will be appreciated that in some such embodiments (discussed below) the vehicle 10 may be any type motor vehicle whatsoever regardless of source of propulsion and may also include vehicles powered by an internal combustion engine, such as a spark-ignition engine or a compression-ignition engine, a fuel cell, natural gas, propane, or the like (in addition to the electric vehicles described above).

In some such embodiments, the tow vehicle attribute includes deceleration and the at least one sensor 62 may include any one or more of the accelerometer 86, the vehicle speed sensor 88, the wheel speed sensor 90, the motor speed sensor 92, the back emf sensor 94, and/or the forward-facing camera 84.

In such embodiments, the data indicative of the tow vehicle attribute includes at least one datum such as sensed deceleration of the vehicle 10 from the accelerometer 86, sensed vehicle speed of the vehicle 10 from the vehicle speed sensor 88, sensed wheel speed of the vehicle 10 from the wheel speed sensor 90, sensed motor speed of the vehicle 10 from motor speed sensor 92, sensed back emf of one or more of the electric motors 58 of the vehicle 10 from the back emf sensor 94, and visually detected illumination of at least one brake light 18 of the tow vehicle 12 from the forward-facing camera 84.

In various such embodiments the instructions are further configured to cause the processor 66 to cause at least one action such as applying proportional braking via at least one braking process like application of friction brakes, application of regenerative braking, and illuminating at least one brake light responsive to data indicative of tow vehicle deceleration.

Illustrative details regarding synchronization of the brake light 18 of the tow vehicle 12 and the brake light of the vehicle 10 have been discussed above and are not repeated for sake of brevity.

In some such embodiments, responsive to data indicative of tow vehicle deceleration the processor 66 causes the brake system 76 to apply proportional braking via application of friction brakes. In such embodiments, the friction brakes may be part of a brake-by-wire system or part of any other type of brake system as desired.

It will be appreciated that, in embodiments that synchronize the brake light 18 of the tow vehicle 12 and the brake light of the vehicle 10 and that synchronize proportional braking via application of friction brakes, the vehicle 10 may be any type motor vehicle whatsoever regardless of source of propulsion and may also include vehicles powered by an internal combustion engine, such as a spark-ignition engine or a compression-ignition engine, a fuel cell, natural gas, propane, or the like (in addition to the electric vehicles described above).

In some other such embodiments, responsive to data indicative of tow vehicle deceleration the processor 66 causes the brake system 76 to apply proportional braking via application of regenerative braking. In such embodiments the ECU 64 communicates with the inverter controller 60 via the peer-to-peer network bus 70 to cause the processor 61 to control the inverter 56 to apply proportional regenerative braking. It will be appreciated that application of regenerative braking can help contribute to reducing wear of friction brakes of the vehicle 10, thereby helping contribute to increasing life of friction brakes of the vehicle 10. Details regarding regenerative braking will be discussed further below by way of illustration only and not of limitation.

In some other embodiments the vehicle 10 may be brought to a safe stop if the physical tow connection between the tow vehicle 12 and the vehicle 10 is broken. That is, the vehicle 10 may be brought to a safe stop if, when the vehicle 10 is being towed behind the tow vehicle 12, the tow bar 24 breaks, or if the shank 26 of the tow bar 24 becomes disconnected from the hitch receiver 38 of the tow vehicle 12, or if one or more of the arms 32 of the tow bar 24 become disconnected from the cross member 42.

In such embodiments the tow vehicle attribute includes distance from the tow vehicle 12 to the vehicle 10 and the at least one sensor 62 includes at least one distance sensor such as the radar sensor 96, the LIDAR sensor 98, the SODAR sensor 100, and the ultrasound sensor 102. It will be appreciated that such sensors may be included in an Advanced Driver Assistance Systems (ADAS) suite of sensors. It will also be appreciated that some such sensors may also be referred to as front parking sensors and/or adaptive cruise control sensors. In such embodiments the data indicative of the tow vehicle attribute includes at least one datum such as sensed distance from the tow vehicle.

In such embodiments the instructions are further configured to cause the processor 66 to cause braking to be applied via at least one braking process such as application of friction brakes and/or application of regenerative braking responsive to sensed distance from the tow vehicle 12 differing from a predetermined distance, and the braking is sufficient to bring the vehicle 10 to a stop.

For example, in some such embodiments the predetermined distance may be the distance between the tow vehicle 12 and the vehicle 10 when the vehicle 10 is tethered to the tow vehicle with the tow bar 24. If, when the vehicle 10 is being towed behind the tow vehicle 12, the tow bar 24 breaks, or if the shank 26 of the tow bar 24 becomes disconnected from the hitch receiver 38 of the tow vehicle 12, or if one or more of the arms 32 of the tow bar 24 become disconnected from the cross member 42, then the distance between the tow vehicle 12 and the vehicle 10 will change.

For example, in some instances the towed vehicle 12 and the vehicle 10 will get farther away from each other as the vehicle 10 coasts and slows but the tow vehicle 12 continues to be driven. As another example, in some other instances the towed vehicle 12 and the vehicle 10 will get closer each other as the vehicle 10 coasts and slows (decelerates) but the tow vehicle 12 brakes or otherwise slows (decelerates) faster than the rate of slowing (or deceleration) of the vehicle 10. Regardless, in either case, the processor 66 causes braking to be applied via at least one braking process such as application of friction brakes and application of regenerative braking responsive to sensed distance from the tow vehicle 12 differing from the predetermined distance, and the braking is sufficient to bring the vehicle 10 to a stop—thereby helping to secure a "runaway" vehicle 10.

Figure 3A:
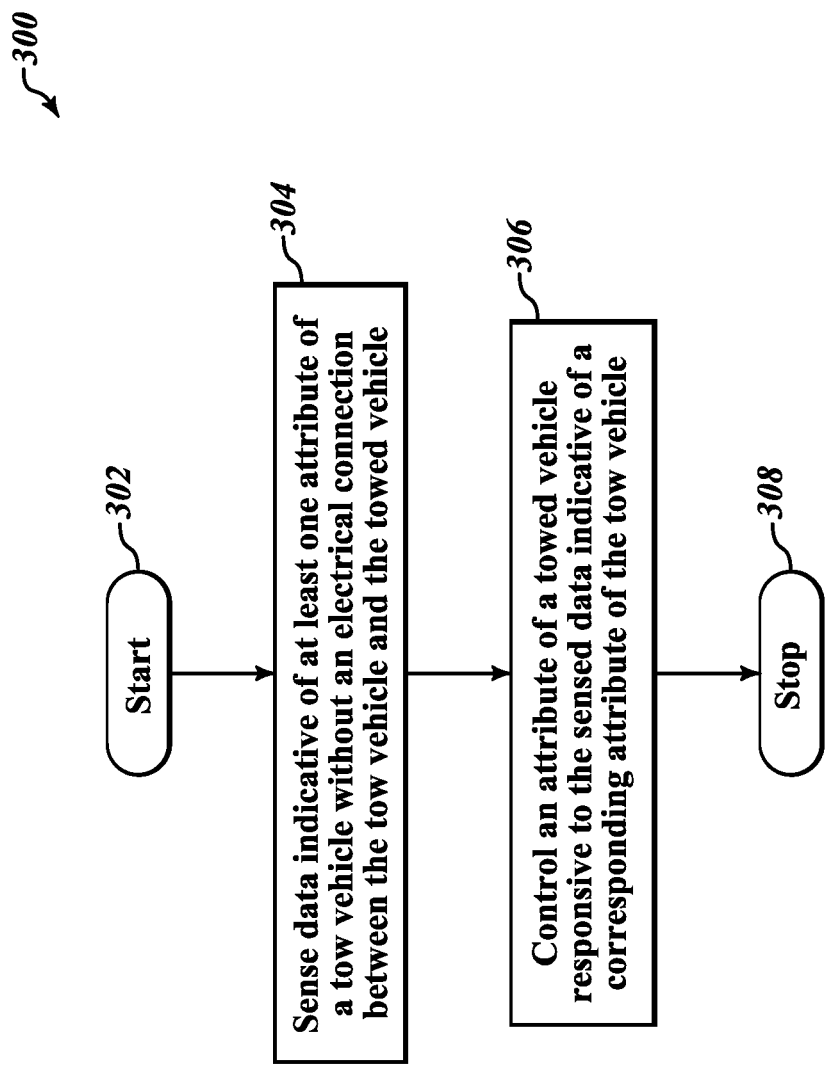
FIG. 3A is a flow chart of an illustrative method of controlling towing of a vehicle without an electrical connection between a tow vehicle and a towed vehicle.

Referring additionally to FIG. 3A, in various embodiments a method 300 is provided for controlling towing of a towed vehicle without an electrical connection between a tow vehicle and the towed vehicle. The method 300 starts at a block 302. At a block 304 data indicative of at least one attribute of a tow vehicle is sensed without an electrical connection between the tow vehicle and the towed vehicle. At a block 306 an attribute of a towed vehicle is controlled responsive to the sensed data indicative of a corresponding attribute of the tow vehicle. The method 300 stops at a block 308.

Figure 3B:
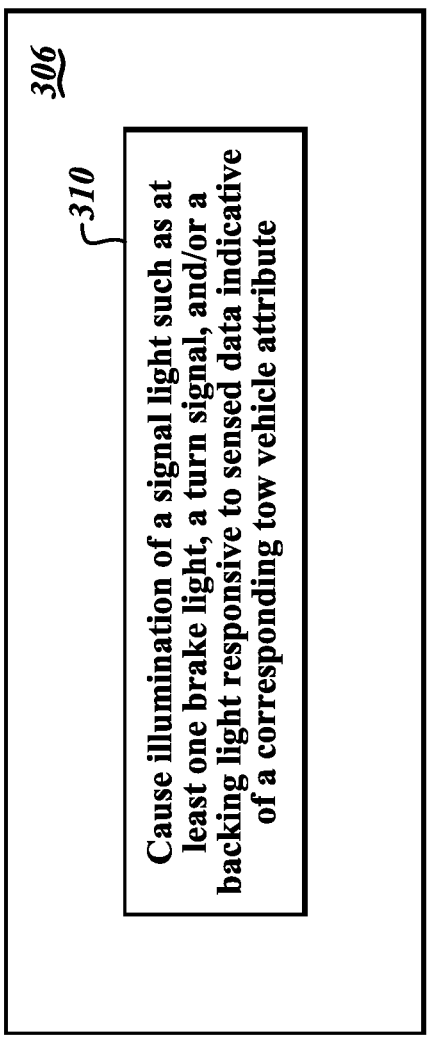
FIGS. 3B-3D are flow charts of details of the method of FIG. 3A.

Referring additionally to FIG. 3B, in various embodiments the tow vehicle attribute includes visual signaling and the sensed data indicative of the tow vehicle attribute includes at least one datum such as visually detected illumination of at least one brake light, visually detected illumination of a turn signal, and/or visually detected illumination of a backing light. In such embodiments, controlling an attribute of a towed vehicle responsive to the sensed data indicative of a corresponding attribute of the tow vehicle at the block 306 includes causing illumination of a signal light such as at least one brake light, a turn signal, and/or a backing light responsive to sensed data indicative of a corresponding tow vehicle attribute at a block 310.

Figure 3C:
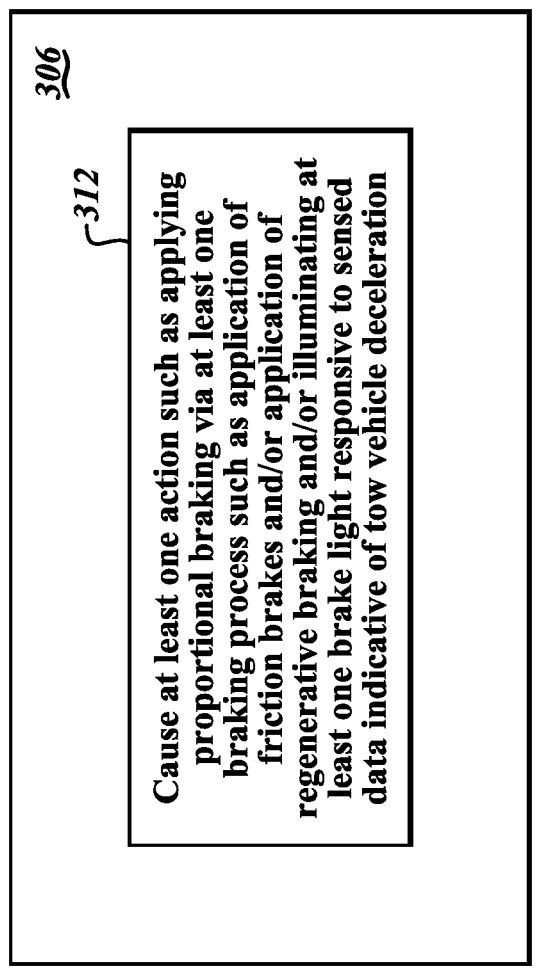

Referring additionally to FIG. 3C, in various embodiments the tow vehicle attribute includes deceleration and the sensed data indicative of the tow vehicle attribute includes at least one datum such as sensed deceleration of the towed vehicle, sensed vehicle speed of the towed vehicle, sensed wheel speed of the towed vehicle, sensed motor speed of the towed vehicle, sensed back emf of an electric motor of the towed vehicle, and/or visually detected illumination of at least one brake light of the tow vehicle. In such embodiments, controlling an attribute of a towed vehicle responsive to the sensed data indicative of a corresponding attribute of the tow vehicle at the block 306 includes causing at least one action such as applying proportional braking via at least one braking process such as application of friction brakes and/or application of regenerative braking and/or illuminating at least one brake light responsive to data indicative of tow vehicle deceleration at a block 312.

Figure 3D:
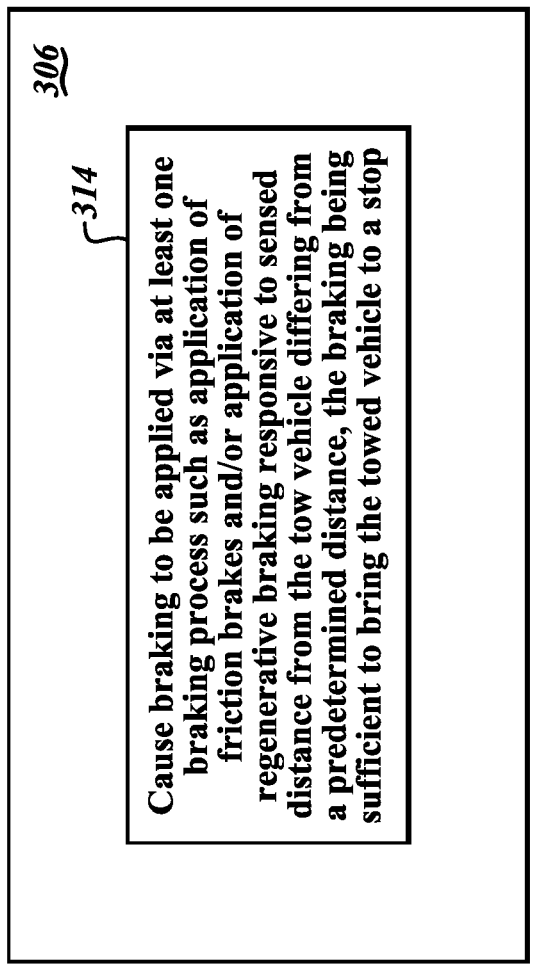

Referring additionally to FIG. 3D, in various embodiments the tow vehicle attribute includes distance between the tow vehicle and the towed vehicle and the sensed data indicative of the tow vehicle attribute includes at least one datum chosen from sensed distance from the tow vehicle. In such embodiments, controlling an attribute of a towed vehicle responsive to the sensed data indicative of a corresponding attribute of the tow vehicle at the block 306 includes causing braking to be applied via at least one braking process such as application of friction brakes and/or application of regenerative braking responsive to sensed distance from the tow vehicle differing from a predetermined distance, the braking being sufficient to bring the towed vehicle to a stop at a block 314.

Now that various embodiments of controlling towing of the vehicle 10 without an electrical connection between the tow vehicle 12 and the vehicle 10 have been explained by way of illustration only and not of limitation, various embodiments of controlling the inverter 56 of the vehicle 10 will be set forth below by way of illustration only and not of limitation.

In various embodiments the computer-executable instructions are configured to cause the processor 66 to receive sensed data indicative of detected deceleration of the tow vehicle 12 and, during detected deceleration, control the inverter 56 of the vehicle 10 responsive to the detected deceleration—such as to apply regenerative braking during the detected deceleration and/or to charge the battery 50 during the detected deceleration.

In some such embodiments, the at least one sensor 62 includes at least one sensor such as the accelerometer 86, the vehicle speed sensor 88, the wheel speed sensor 90, the motor speed sensor 92, the back emf sensor 94, and the camera 84. In such embodiments, the sensed data indicative of detected deceleration of the tow vehicle can include data such as sensed deceleration of the vehicle 10 from the accelerometer 86, sensed vehicle speed of the vehicle 10 from the vehicle speed sensor 88, sensed wheel speed of the vehicle 10 from the wheel speed sensor 90, sensed motor speed of the vehicle 10 from motor speed sensor 92, sensed back emf of one or more of the electric motors 58 of the vehicle 10 from the back emf sensor 94, and visually detected illumination of at least one brake light 18 of the tow vehicle 12 from the forward-facing camera 84.

Figure 4:
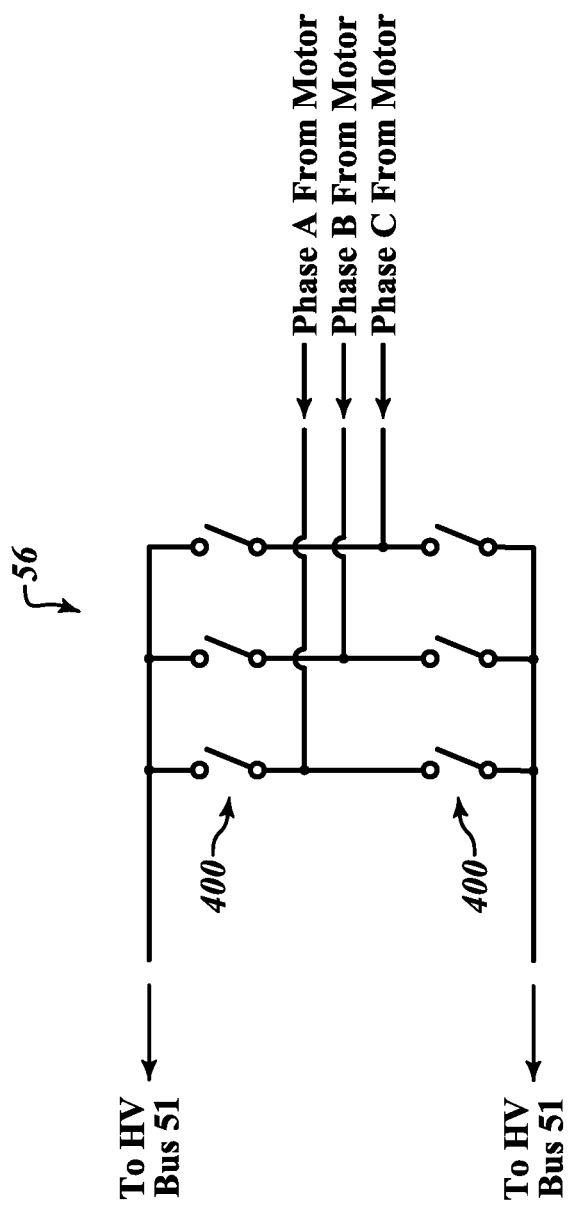
FIG. 4 is a block diagram of an illustrative inverter.

Referring additionally to FIG. 4, in various embodiments the inverter 56 includes switches 400. In various embodiments the switches 400 may include any suitable inverter switch as desired, such as without limitation metal-oxide-semiconductor (MOS) field-effect transistors (FETs) (MOSFETs) and/or insulated-gate bipolar transistors (IGBTs), or the like, as desired for a particular application. The switches 400 are shown for purposes of illustration only and are not intended to represent any particular switching condition or configuration. It will be appreciated that the switches 400 may be switched via drive signals provided to gate terminals (not shown for purposes of clarity) of the switches 400 from a gate drive circuit (not shown for purposes of clarity) within or driven by the inverter controller 60. In various embodiments, the gate terminals of the switches 400 may be driven via any modulation scheme as desired, such as, without limitation, pulse width modulation or the like.

Given by way of illustration only and not of limitation, during towing of the towed vehicle 10 when deceleration is not detected, the switches 400 are activated by the inverter controller 60 to generate zero torque and to minimize back emf with respect to speed, thereby helping allow the vehicle 10 to be towed at higher speeds (such as at highway speeds). In various embodiments, a small amount of electrical energy is put into the electric motor 58 to cancel losses generated by the electric motor 58 being rotated in order to effect zero mechanical output from the electric motor 58. As such, in such embodiments the battery 50 is electrically connected to the HV DC bus 51 while the vehicle 10 is being towed, thereby helping prevent components of the inverter 56 and components of the HV DC bus 51 from being subjected to voltages that may be greater than their designed voltage ranges.

Also given by way of illustration only and not of limitation, in various embodiments, during deceleration, deceleration is detected as described above. In response to the detected deceleration, the ECU 64 issues a negative torque request (proportional to the amount of detected deceleration) to the inverter controller 60. Energy is produced by the electric motor 58 when subjected to the negative torque request. This imparts negative torque at the drive member 82 (that is, regenerative braking), which produces electrical energy that is returned to the battery 50, thereby charging the battery 50.

In view of the illustrative examples set forth above, in various embodiments the computer-executable instructions are configured to cause the processor 66 to, during detected deceleration, control the inverter 56 of the vehicle 10 responsive to the detected deceleration—such as to apply regenerative braking during the detected deceleration and/or to charge the battery 50 during the detected deceleration. Thus, in various embodiments the battery 50 is not charged when deceleration is not detected and regenerative braking is not applied when deceleration is not detected.

In various embodiments the instructions are further configured to cause the processor 66 to, responsive to the detected deceleration and during the detected deceleration, cause the inverter controller 60 to control activation of the switches 400, during the detected deceleration, in inverters 56 for electric motors 58 that are rotatable during towing. In some such embodiments, the instructions are further configured to cause the processor 66 to, responsive to the detected deceleration, apply regenerative braking during the detected deceleration. As described above, in various embodiments an amount of regenerative braking is proportional to an amount of the detected deceleration. In various embodiments, the processor 66 causes the inverter controller 60 to control the inverter 56 to generate an amount of regenerative braking that is proportional to an amount of the detected deceleration.

In various embodiments the instructions are further configured to cause the processor 66 to, responsive to the detected deceleration, during the detected deceleration charge the electrical battery 50 with electrical power generated by electric motors 58 that are rotatable during towing.

In such embodiments, an amount of electrical power supplied to charge the electrical battery is limited to a threshold amount of electrical power—such as an amount of electrical power used by various low voltage electrical loads energizable during towing, such as, for example, various control units, external lighting systems, coolant pumps for cooling the drive units 54 and their components, and the like. For example, in various embodiments the BMU 74 communicates SOC to the ECU 64. When SOC of the battery 50 has been replenished (such as by the threshold amount of electrical power) to a desired SOC, the processor 66 causes charging of the battery 50 to stop. Thus, various embodiments can help allow avoiding depletion of the battery 50 and still have functionality of the various low voltage electrical loads.

In various embodiments the processor 66 causes the inverter controller 60 to control the inverter 56 to generate zero torque (that is, effect zero mechanical output from the electric motor 58) when deceleration is no longer detected as described above.

Figure 5A:
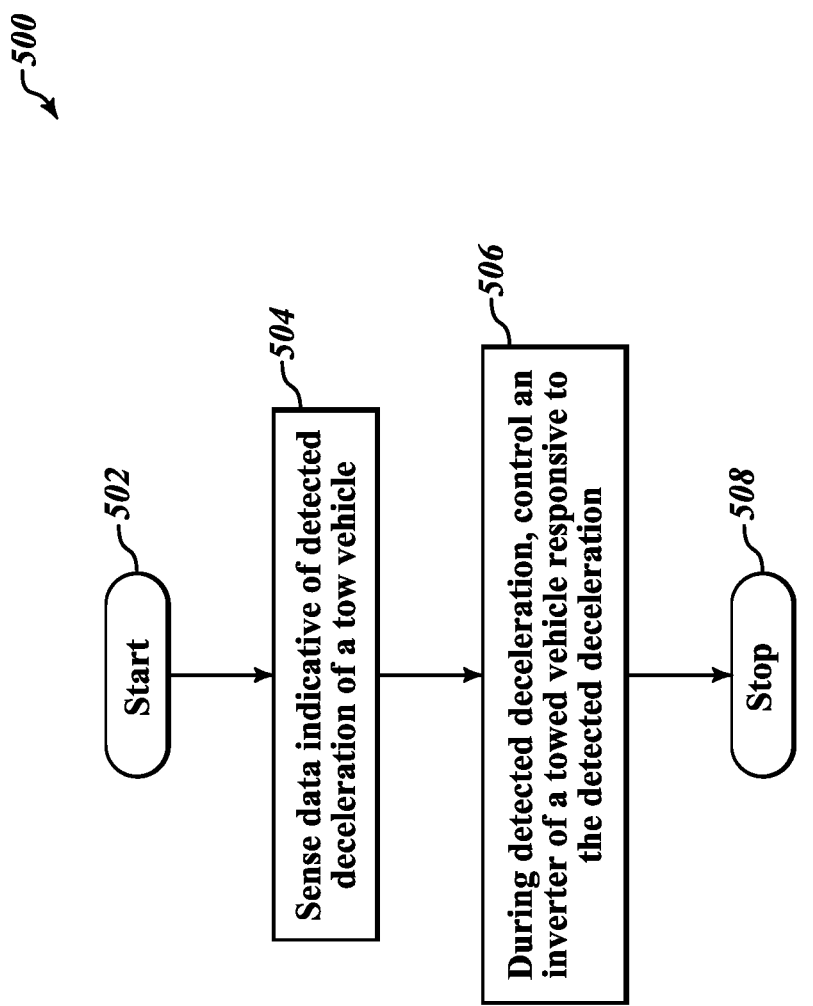
FIG. 5A is a flow chart of an illustrative method of controlling an inverter of a towed vehicle.

Referring additionally to FIG. 5A, in various embodiments a method 500 is provided for controlling an inverter of a towed vehicle. The method 500 starts at a block 502. At a block 504 data indicative of detected deceleration of a tow vehicle is sensed. At a block 506 during detected deceleration, an inverter of a towed vehicle is controlled responsive to the detected deceleration. The method 500 stops at a block 508.

Figure 5B:
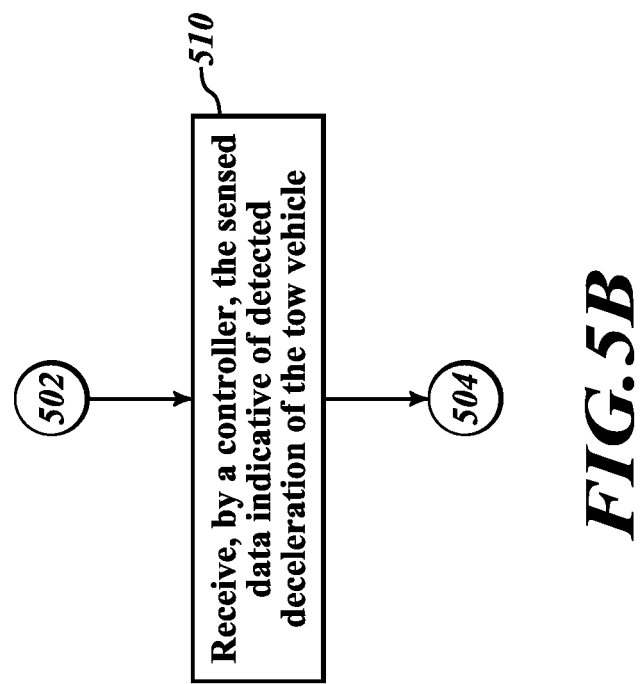

Referring additionally to FIG. 5B, in various embodiments at a block 510 the sensed data indicative of detected deceleration of the tow vehicle is received by a controller.

Figure 5C:
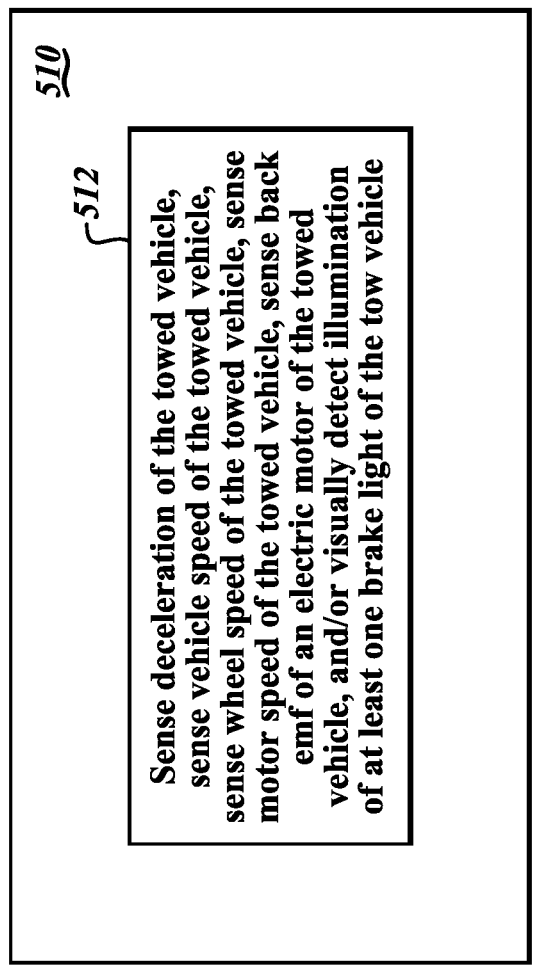

Referring additionally to FIG. 5C, in various embodiments detecting deceleration of the tow vehicle at the block 510 includes at least one sensing action such as sensing deceleration of the towed vehicle, sensing vehicle speed of the towed vehicle, sensing wheel speed of the towed vehicle, sensing motor speed of the towed vehicle, sensing back emf of an electric motor of the towed vehicle, and/or visually detecting illumination of at least one brake light of the tow vehicle at a block 512.

Figure 5D:
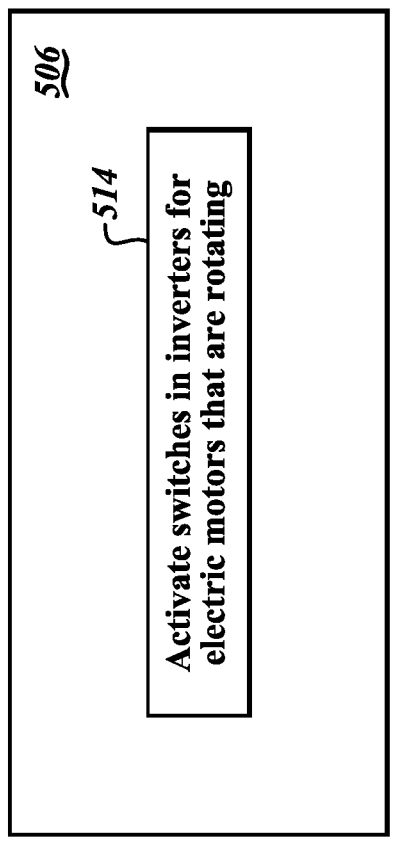

Referring additionally to FIG. 5D, in various embodiments controlling an inverter of a towed vehicle responsive to the detected deceleration at the block 506 includes activating switches in inverters for electric motors that are rotating at a block 514.

Referring additionally to FIG. 5E, in various embodiments at a block 516 regenerative braking is applied to the towed vehicle. In various embodiments an amount of regenerative braking is proportional to an amount of the detected deceleration.

Figure 5F:
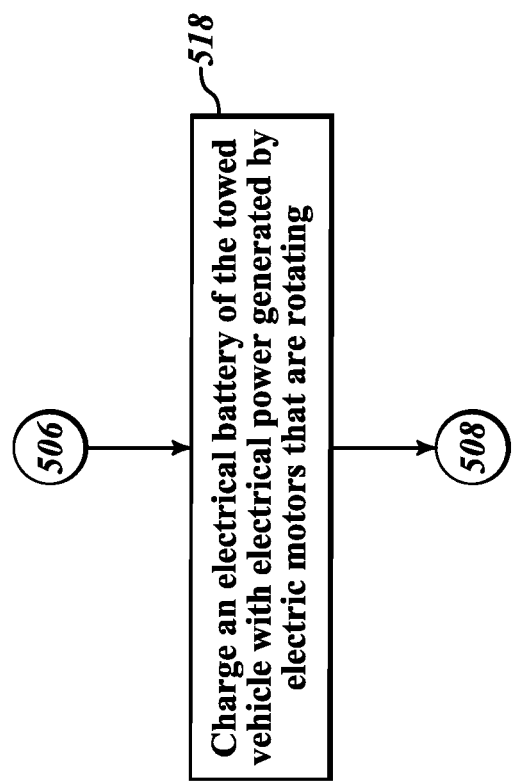

Referring additionally to FIG. 5F, in various embodiments at a block 518 an electrical battery of the towed vehicle is charged with electrical power generated by electric motors that are rotating. In various embodiments an amount of electrical power supplied to charge the electrical battery is limited to a threshold amount of electrical power, such as an amount of electrical power used by electrical loads energized during towing.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware.

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. A system comprising:
   a controller including:
      a processor; and
      a non-transitory computer-readable media configured to store computer-executable instructions configured to cause the processor to:
         receive, from a sensor suite comprising a forward-facing camera, sensed data indicative of an attribute of a tow vehicle comprising a visual attribute without an electrical connection between the tow vehicle and a towed vehicle; and
         control an attribute of the towed vehicle responsive to the sensed data indicative of a corresponding attribute of the tow vehicle.

2. The system of claim 1, wherein:
   the visual attribute of the tow vehicle attribute includes a visual signaling attribute; and
   the sensed data indicative of the visual attribute includes at least one datum chosen from:
   visually detected illumination of a brake light of the tow vehicle,
   visually detected illumination of a turn signal of the tow vehicle, and
   visually detected illumination of a backing light of the tow vehicle.

3. The system of claim 2, wherein the instructions are further configured to cause the processor to cause illumination of a signal light responsive to data indicative of the corresponding tow vehicle attribute, the signal light chosen from:
   a brake light of the towed vehicle,
   a turn signal of the towed vehicle, and
   a backing light of the towed vehicle.

4. The system of claim 1, wherein:
   the tow vehicle attribute includes deceleration; and
   the sensed data includes at least one datum chosen from:
   sensed deceleration of the towed vehicle,
   sensed vehicle speed of the towed vehicle,
   sensed wheel speed of the towed vehicle,
   sensed motor speed of the towed vehicle,
   sensed back emf of an electric motor of the towed vehicle, and
   visually detected illumination of at least one brake light of the tow vehicle.

5. The system of claim 4, wherein the instructions are further configured to cause the processor to cause at least one action chosen from:
   applying proportional braking via at least one braking process chosen from application of friction brakes and application of regenerative braking; and
   illuminating at least one brake light responsive to data indicative of tow vehicle deceleration.

6. The system of claim 1, wherein:
   the tow vehicle attribute includes a distance between the tow vehicle and the towed vehicle; and
   the sensed data indicative of the at least one tow vehicle attribute includes the distance.

7. The system of claim 6, wherein the instructions are further configured to cause the processor to cause braking sufficient to bring the towed vehicle to a stop, responsive to the distance differing from a predetermined distance, the braking applied via at least one braking process chosen from:
   an application of friction brakes; and
   an application of regenerative braking.

8. A vehicle comprising:
   a plurality of rotatable wheels;
   a sensor suite comprising a forward-facing camera; and
   a controller including:
      a processor; and
      a non-transitory computer-readable media configured to store computer-executable instructions configured to cause the processor to:
         receive, from the sensor suite, sensed data indicative of a visual attribute of a tow vehicle without an electrical connection between the tow vehicle and the towed vehicle; and
         control an attribute of a towed vehicle responsive to the sensed data indicative of a corresponding attribute of the tow vehicle.

9. The vehicle of claim 8, wherein:
   the visual attribute of the tow vehicle attribute includes a visual signaling attribute; and
   the data indicative of the tow vehicle attribute includes at least one datum chosen from:
   visually detected illumination of at least one brake light, visually detected illumination of a turn signal, and
visually detected illumination of a backing light.

10. The vehicle of claim 9, wherein the instructions are further configured to cause the processor to cause illumination of a signal light responsive to data indicative of a corresponding tow vehicle attribute, the signal light chosen from:
a brake light,
a turn signal, and
a backing light.

11. The vehicle of claim 8, wherein:
the tow vehicle attribute includes deceleration;
the sensor suite includes at least one sensor chosen from:
an accelerometer,
a vehicle speed sensor, and
a wheel speed sensor, and
the data indicative of the tow vehicle attribute includes at least one datum chosen from:
sensed deceleration of the towed vehicle,
sensed vehicle speed of the towed vehicle,
sensed wheel speed of the towed vehicle, and
visually detected illumination of at least one brake light of the tow vehicle.

12. The vehicle of claim 11, wherein the instructions are further configured to cause the processor to cause an application of proportional braking via application of friction brakes and illuminating at least one brake light responsive to data indicative of tow vehicle deceleration.

13. The vehicle of claim 8, further comprising:
at least one drive unit including:
at least one inverter; and
at least one electric motor electrically couplable to the at least one inverter and rotatably couplable to at least one of the plurality of rotatable wheels; and
wherein:
the tow vehicle attribute includes deceleration;
the sensor suite includes at least one sensor chosen from:
an accelerometer,
a vehicle speed sensor,
a wheel speed sensor,
a motor speed sensor, or
a back emf sensor, and
the data indicative of the at least one tow vehicle attribute includes at least one datum chosen from:
sensed deceleration of the towed vehicle,
sensed vehicle speed of the towed vehicle,
sensed wheel speed of the towed vehicle,
sensed motor speed of the towed vehicle,
sensed back emf of an electric motor of the towed vehicle, and
visually detected illumination of at least one brake light of the tow vehicle.

14. The vehicle of claim 13, wherein the instructions are further configured to cause the processor to cause at least one action chosen from:
applying proportional braking via at least one braking methodology chosen from:
application of friction brakes; and
application of regenerative braking; and
illuminating at least one brake light responsive to data indicative of tow vehicle deceleration.

15. The vehicle of claim 8, wherein:
the tow vehicle attribute includes a distance from the tow vehicle;
the sensor suite includes a distance sensor chosen from:
a radar sensor,
a LIDAR sensor,
a SODAR sensor, and
an ultrasound sensor;
the data indicative of the tow vehicle attribute includes a sensed distance from the tow vehicle; and
the instructions are further configured to cause the processor to cause braking sufficient to bring the towed vehicle to a stop to be applied via application of friction brakes responsive to the sensed distance differing from a predetermined distance.

16. The vehicle of claim 8, further comprising:
at least one drive unit including:
at least one inverter; and
at least one electric motor electrically couplable to the at least one inverter and rotatably couplable to at least one of the plurality of rotatable wheels; and
wherein:
the tow vehicle attribute includes distance from the tow vehicle;
the sensor suite includes at least one distance sensor chosen from:
a radar sensor,
a LIDAR sensor,
a SODAR sensor, and
an ultrasound sensor;
the data indicative of the tow vehicle attribute includes a distance from the tow vehicle; and
the instructions are further configured to cause the processor to cause braking to be applied via at least one braking process chosen from:
application of friction brakes; and
application of regenerative braking responsive to sensed distance from the tow vehicle differing from a predetermined distance, the braking being sufficient to bring the towed vehicle to a stop.

17. A method comprising:
sensing, with a sensor suite comprising a forward-facing camera, data indicative of at least one attribute of a tow vehicle without an electrical connection between the tow vehicle and a towed vehicle; and
controlling an attribute of a towed vehicle responsive to the sensed data indicative of a corresponding attribute of the tow vehicle, the sensed data comprising visual data.

18. The method of claim 17, wherein:
the tow vehicle attribute includes visual signaling; and
the sensed data indicative of the tow vehicle attribute includes a datum chosen from visually detected illumination of:
a brake light,
visually detected illumination of a turn signal, and
visually detected illumination of a backing light; and
further comprising causing illumination of a signal light responsive to sensed data indicative of a corresponding tow vehicle attribute, the signal light chosen from:
a brake light,
a turn signal, and
a backing light.

19. The method of claim 17, wherein:
the tow vehicle attribute includes deceleration; and
the sensed data indicative of the tow vehicle attribute includes at least one datum chosen from:
sensed deceleration of the towed vehicle,
sensed vehicle speed of the towed vehicle,
sensed wheel speed of the towed vehicle,
sensed motor speed of the towed vehicle, sensed back emf of an electric motor of the towed vehicle, and visually detected illumination of at least one brake light of the tow vehicle; and further comprising causing at least one action chosen from:

applying proportional braking via at least one braking process chosen from application of friction brakes and application of regenerative braking and illuminating at least one brake light responsive to sensed data indicative of tow vehicle deceleration.

20. The method of claim 17, wherein:

the tow vehicle attribute includes a distance between the tow vehicle and the towed vehicle; and the data indicative of the tow vehicle attribute includes at least one datum chosen from the distance; and further comprising causing braking to be applied via at least one braking process chosen from application of friction brakes and application of regenerative braking responsive to sensed distance from the tow vehicle differing from a predetermined distance, the braking being sufficient to bring the towed vehicle to a stop.

\* \* \* \* \*